United States Patent
Li et al.

(10) Patent No.: US 12,202,745 B2
(45) Date of Patent: Jan. 21, 2025

(54) UV LED STERILIZING TANK

(71) Applicant: A. O. SMITH CORPORATION, Milwaukee, WI (US)

(72) Inventors: Chen Li, Menomonee Falls, WI (US); Ming Kuo, Charlotte, TN (US); Yilda Torres, Milwaukee, WI (US)

(73) Assignee: A. O. SMITH CORPORATION, Milwaukee, WI (US)

( * ) Notice: Subject to any disclaimer, the term of this patent is extended or adjusted under 35 U.S.C. 154(b) by 404 days.

(21) Appl. No.: 17/626,404

(22) PCT Filed: Jul. 17, 2020

(86) PCT No.: PCT/US2020/042521
§ 371 (c)(1),
(2) Date: Jan. 11, 2022

(87) PCT Pub. No.: WO2021/016077
PCT Pub. Date: Jan. 28, 2021

(65) Prior Publication Data
US 2022/0259076 A1    Aug. 18, 2022

Related U.S. Application Data (60) Provisional application No. 62/876,320, filed on Jul. 19, 2019.

(51) Int. Cl.
*C02F 1/32* (2023.01)

(52) U.S. Cl.
CPC ...... *C02F 1/325* (2013.01); *C02F 2201/3222* (2013.01); *C02F 2201/3227* (2013.01);
(Continued)

(58) Field of Classification Search
CPC .......... C02F 1/325; C02F 2201/3222; C02F 2201/3227; C02F 2201/3228; C02F 2201/326; C02F 2303/04
(Continued)

(56) References Cited

U.S. PATENT DOCUMENTS

| 5,596,450 A | 1/1997 | Hannon et al. |
| 5,598,450 A | 1/1997 | Proebstle et al. |

(Continued)

FOREIGN PATENT DOCUMENTS

| CN | 202717604 U | 2/2013 |
| CN | 104016443 A | 9/2014 |

(Continued)

OTHER PUBLICATIONS

China National Intellectual Property Administration First Notification of Office Action for application No. 202080064171.4, dated May 19, 2023 (23 pages with translation).
(Continued)

*Primary Examiner* — Jason L McCormack
(74) *Attorney, Agent, or Firm* — Michael Best & Friedrich LLP (57) ABSTRACT

A water tank configured to store water from a water supply includes an inlet configured to receive water from the water supply, and an outlet configured to dispense water. The water tank includes a reflective coating positioned on an inner surface of the tank, and an end wall including a light emitting diode oriented toward the outlet. The light emitting diode and the reflective coating are operable to disinfect water from the water supply.

18 Claims, 5 Drawing Sheets

(52) U.S. Cl.
CPC ................ *C02F 2201/3228* (2013.01); *C02F 2201/326* (2013.01); *C02F 2303/04* (2013.01)

(58) Field of Classification Search
USPC ............................ 250/432 R, 453.11, 455.11
See application file for complete search history.

(56) References Cited

U.S. PATENT DOCUMENTS

| | | | |
|---|---|---|---|
| 6,190,609 B1 * | 2/2001 | Chapman | A61M 1/3683 435/283.1 |
| 8,614,425 B2 | 12/2013 | Conradt et al. | |
| 8,742,364 B2 | 6/2014 | Boodaghians et al. | |
| 8,816,300 B1 | 8/2014 | Walker et al. | |
| 9,376,333 B2 | 6/2016 | Boodaghians et al. | |
| 9,834,456 B2 | 12/2017 | Collins et al. | |
| 2003/0059549 A1 | 3/2003 | Morrow et al. | |
| 2010/0209294 A1 | 8/2010 | Owen et al. | |
| 2010/0237254 A1 | 9/2010 | Mason et al. | |
| 2011/0318237 A1 * | 12/2011 | Woodling | C02F 1/325 422/186.3 |
| 2015/0008167 A1 | 1/2015 | Shturm et al. | |
| 2015/0129776 A1 * | 5/2015 | Boodaghians | C02F 1/325 250/432 R |
| 2015/0158741 A1 | 6/2015 | Lee et al. | |
| 2015/0314024 A1 | 11/2015 | Khan et al. | |
| 2016/0047773 A1 | 2/2016 | Selvaganapathy et al. | |
| 2016/0259102 A1 | 9/2016 | Taka | |
| 2017/0291831 A1 | 10/2017 | Maiden et al. | |
| 2018/0086649 A1 | 3/2018 | Hayashi et al. | |
| 2019/0300391 A1 * | 10/2019 | Shatalov | C02F 1/30 |
| 2020/0002191 A1 * | 1/2020 | Mochizuki | A61L 2/10 |
| 2022/0153611 A1 * | 5/2022 | Li | A61L 2/10 |

FOREIGN PATENT DOCUMENTS

| | | | | |
|---|---|---|---|---|
| CN | 204844880 U | 12/2015 | | |
| CN | 105668696 A | 6/2016 | | |
| CN | 205633546 U | 10/2016 | | |
| CN | 205856046 U | 1/2017 | | |
| CN | 206599458 U | 10/2017 | | |
| CN | 107540047 A | 1/2018 | | |
| CN | 108050624 A | 5/2018 | | |
| JP | 2013094690 A | 5/2013 | | |
| KR | 20110010470 A | 2/2011 | | |
| KR | 101217464 B1 | 1/2013 | | |
| WO | WO-2009013507 A1 * | 1/2009 | ............. | C02F 1/325 |
| WO | 2019055348 A1 | 3/2019 | | |

OTHER PUBLICATIONS

Intellectual Property India Examination Report for application No. 202217002017, dated Apr. 28, 2023 (4 pages).
International Search Report and Written Opinion for Application No. PCT/US20/42521 dated Oct. 16, 2020 (18 pages).
International Preliminary Report on Patentability for Application No. PCT/US2020/042521 dated Jan. 25, 2022 (11 pages).
LG Innotek, "LG Innotek Introduces the Waterproof UV LED Module", Feb. 2018, <https://www.prnewswire.com/news-releases/lg-innotek-introduces-the-waterproof-uv-led-module-300603839.html>, 2 pages.
Zhiwei et al., "Water Pollution Control Project", Xuzhou China Mining University Press, p. 353, dated Jul. 31, 2013 (6 pages including Statement of Relevance).
China National Intellectual Property Administration Second Notification of Office Action for application No. 202080064171.4, dated Dec. 15, 2023 (16 pages with English translation).
China National Intellectual Property Administration Search Report for Application No. 202080064171.4 dated Dec. 11, 2023 (4 pages with English translation).

* cited by examiner

UV LED STERILIZING TANK

CROSS-REFERENCE TO RELATED APPLICATIONS

This application claims priority to U.S. Provisional Patent Application No. 62/876,320, filed on Jul. 19, 2019, the entire contents of which are incorporated by reference herein.

FIELD OF THE INVENTION

The present invention relates to a water tank configured to hold and disinfect water at point-of-use.

BACKGROUND

Water tanks are widely used to store treated water. Typically, the water tanks are oversized to ensure customers constantly have access to treated water. Therefore, it is easy for bacteria to grow in the tank during long periods of storage time. Microorganisms from the air additionally contaminate tank water via a tank outlet, or other tank openings.

Often times, water tanks are lined with a reflective liner in order to use total internal reflection (TIR) to conserve UV light and irradiate bacteria. However, TIR methods require the liner to include a lower refraction index than that of the water within the tank, which is expensive to manufacture. Additionally, more cost-effective polymer options, such as liners composed of PFA or acrylic, do not meet the refraction index requirements for TIR. Finally, these methods typically include an air gap positioned between an outer wall of the tank and the liner, which complicates the manufacturing process.

SUMMARY

In one aspect, the invention provides a water tank configured to store water from a water supply, including an inlet configured to receive water from the water supply, an outlet configured to dispense water, a reflective coating positioned on an inner surface of the tank, and an end wall including a light emitting diode oriented toward the outlet, wherein the light emitting diode and the reflective coating are operable to disinfect water from the water supply In another aspect, the invention provides a water tank configured to store water from a water supply, including an inlet configured to receive water from the water supply, an outlet configured to dispense water, a light emitting diode positioned on the inner surface, and a control system operable to modify an operating current of the light emitting diode based on a state of the tank.

In another aspect, the invention provides water tank configured to store water from a water supply, including an inlet configured to receive water from the water supply, an outlet configured to dispense water, a reflective coating positioned along an inner surface of the tank, a first light emitting diode positioned on a first wall of the tank, a second light emitting diode positioned a second wall of the tank, wherein the second wall is positioned perpendicular relative to the first wall, and a control system operable to control the intensity output of the first and second light emitting diodes.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The invention includes a water tank 10 embodying the invention. The water tank 10 includes a water inlet 14 and a water outlet 18, such that the inlet 14 receives water from a water supply and dispenses water at the outlet 18.

The tank 10 may be molded into a main water treatment system or be used separately from the system. Specifically, the tank 10 is operable to hold a filtered water supply (e.g., water from a filtration unit such as a reverse osmosis system, a carbon filter, etc.) prior to consumption. The water supply may therefore be characterized as downstream from the filtration unit and upstream of the inlet 14. A flow of water from the water supply into the inlet 14 is defined as being a downstream water flow. An upstream direction is defined as opposite the downstream water flow. In alternative embodiments, the water supply may be characterized as water received from a municipal water supply, optionally purified or treated or filtered.

With references to FIGS. 1-6, the tank 10 is substantially rectangular. More specifically, the tank 10 includes four side walls 22, a first end wall 26, and a second end wall 30. The side walls 22 are positioned between the first and second end walls 26, 30, such that the side walls 22 are oriented approximately 90 degrees relative to the end walls 26, 30. In the shown embodiments, the side walls 22 and end walls 26, 30 are substantially flat and rectangular. In alternative embodiments, the tank 10 may include different shapes (e.g., circular, conical, and/or alternative flexible shapes), thereby providing rounded side walls 22 and/or rounded end walls 26, 30. The inlet 14 is positioned on one of the side walls 22, and the outlet 18 is positioned on another of the side walls 22, such that the inlet and outlet are positioned on opposite ends of the tank 10. In alternative embodiments, the inlet 14 and outlet 18 may be positioned at alternative locations on the tank 10.

Figure 1:
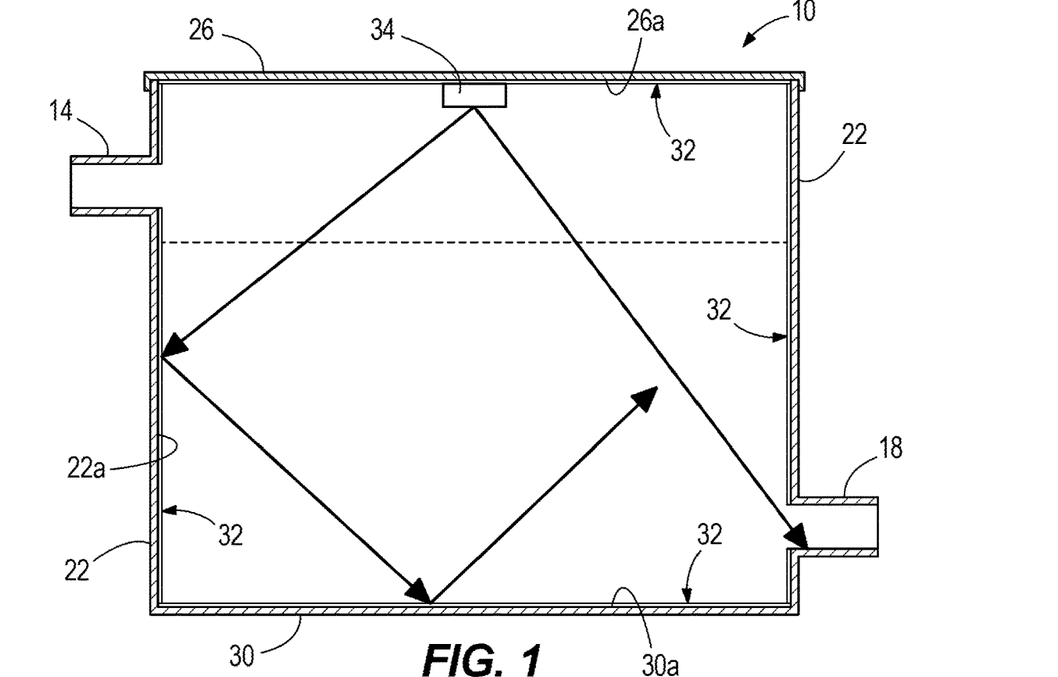
FIG. 1 is a schematic view of a sterilizing tank embodying the invention.
Figure 2:
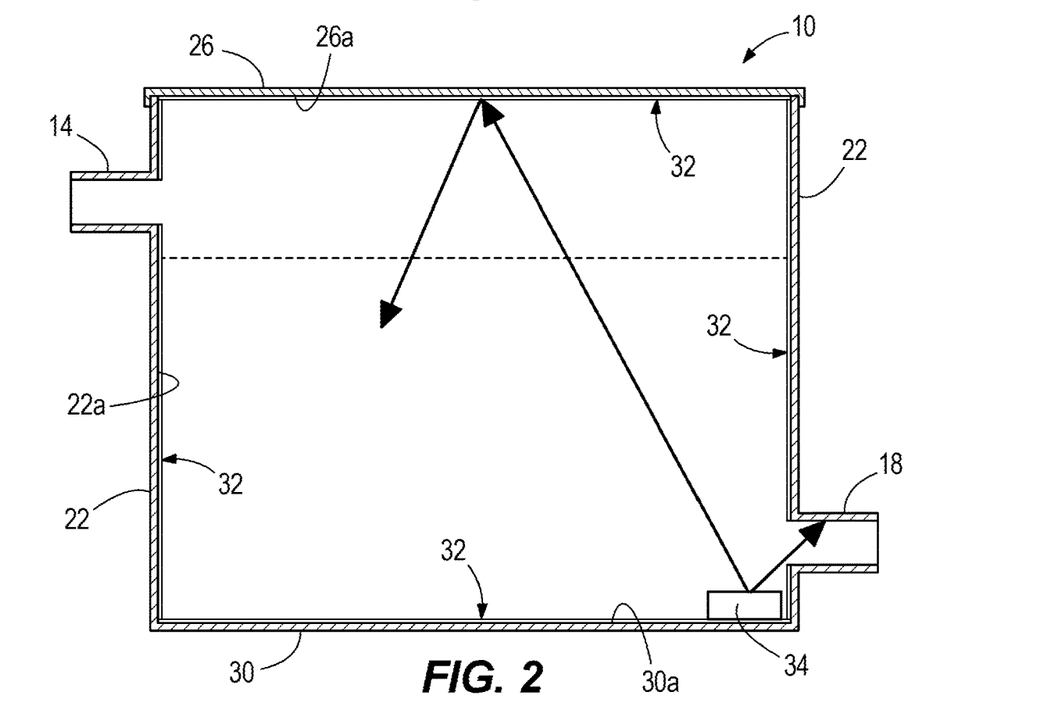
FIG. 2 is a schematic view of the sterilizing tank of FIG. 1, including a UV LED in a second position.
Figure 3:
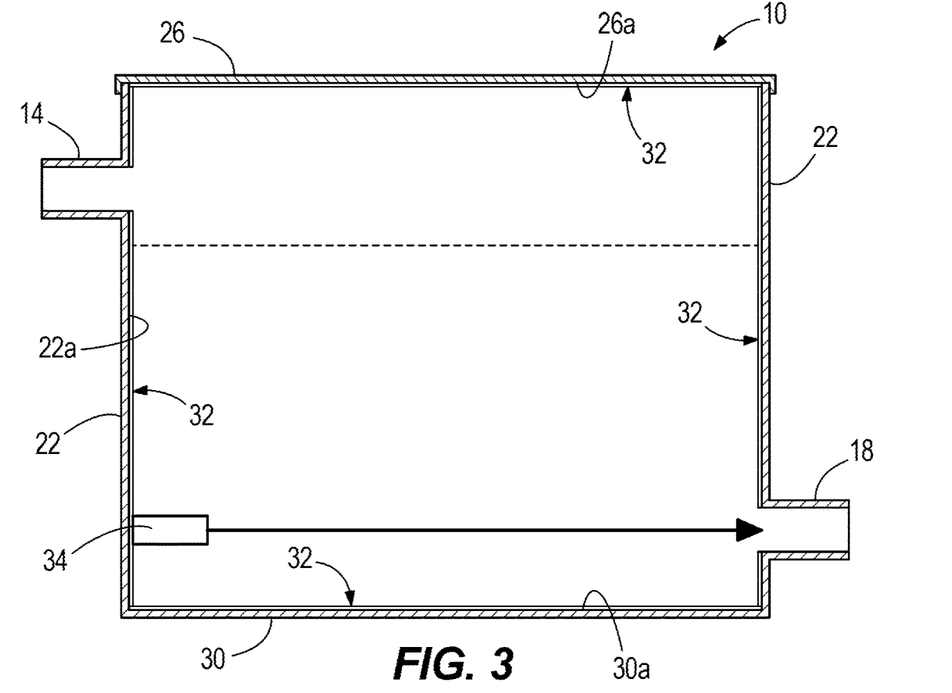
FIG. 3 is a schematic view of the sterilizing tank of FIG. 1, including a UV LED in a third position.
Figure 4:
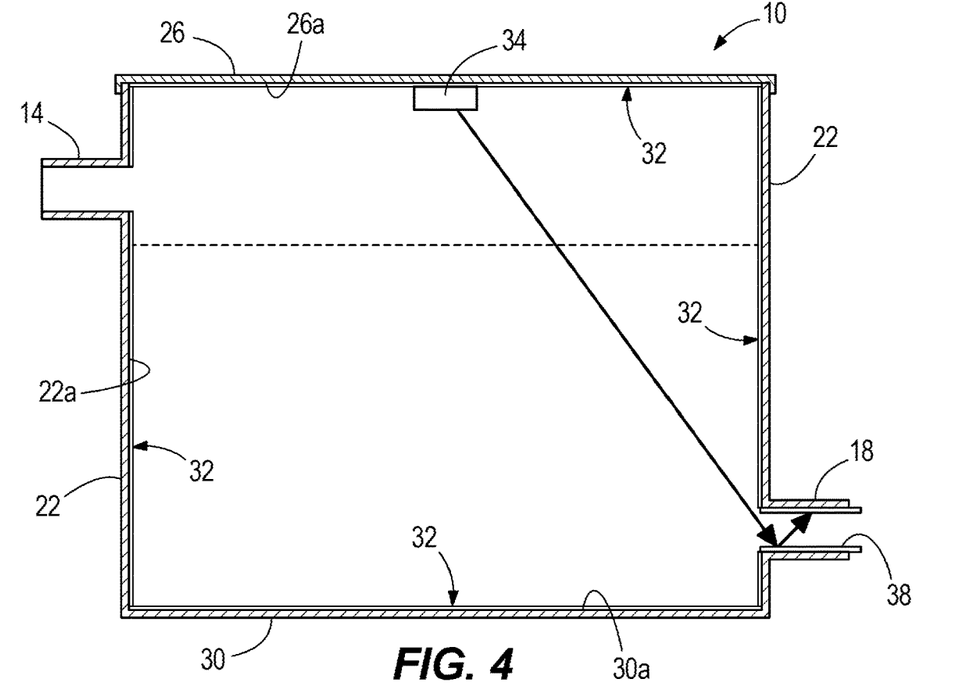
FIG. 4 is a schematic view of the sterilizing tank of FIG. 1, including a UV LED in a fourth position.
Figure 5:
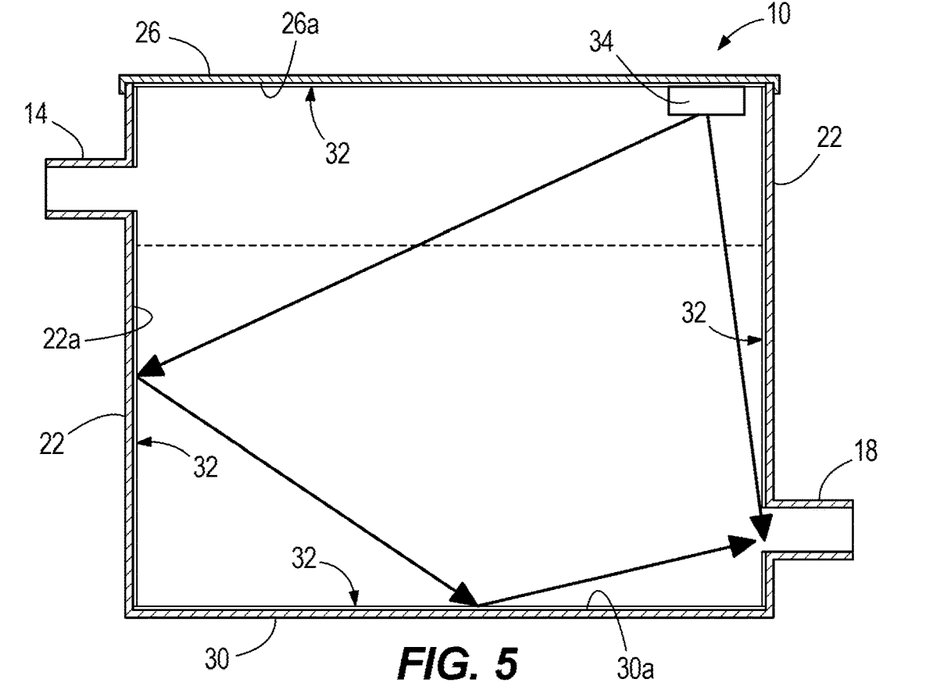
FIG. 5 is a schematic view of the sterilizing tank of FIG. 1, including a UV LED in a fifth position.
Figure 6:
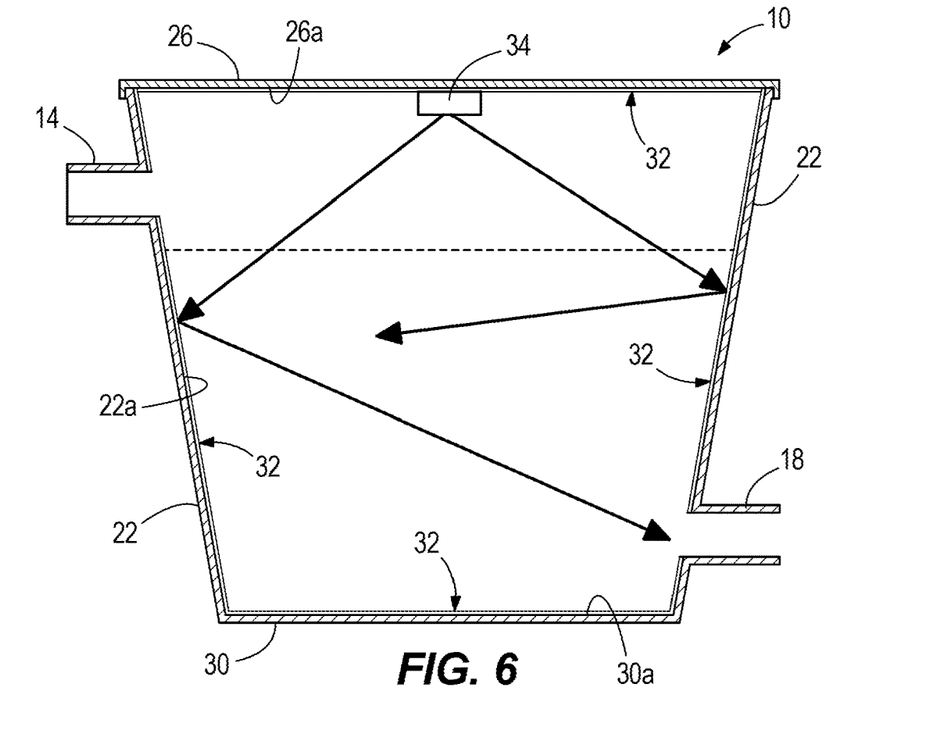
FIG. 6 is a schematic view of the sterilizing tank of FIG. 1, including a UV LED in a sixth position.
Figure 7:
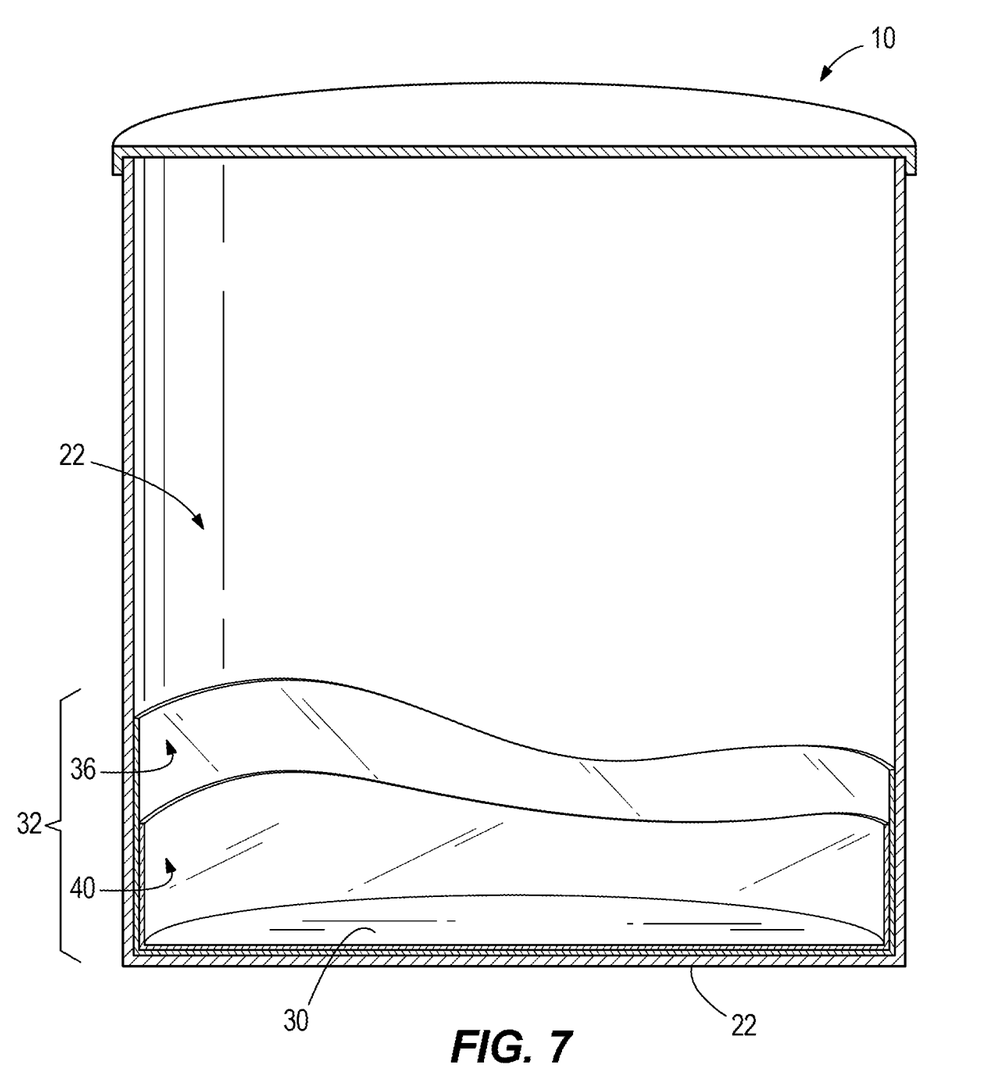
FIG. 7 is an enlarged perspective view of an inner surface of the tank, including a reflective coating.

The side walls 22 and the end walls 26, 30 are constructed of substantially reflective materials. More specifically, the tank 10 may be constructed from metals (e.g., stainless steel, etc.), plastics (e.g., polypropylene, polyethylene, POM, ABS, PTFE, etc.), or alternative materials. The tank 10 additionally includes a reflective coating 32. More specifically, the reflective coating 32 may be applied to an inner surface 22a of the side walls 22, an inner surface 26a of the first end wall 26, and/or an inner surface 30a of the second end wall 30. With reference to FIG. 7, the reflective coating 32 is comprised of the following: (1) a first layer, or primer 36, applied to the inner surface 22a, 36a, 30a of the side walls 22 and/or the end walls 26, 30; and (2) a second layer, or UV clear top coat 40, applied on top of primer 36. In the embodiments described herein, the primer 36 is a high aluminum content primer. However, in alternative embodiments, the primer 36 may be composed of alternative materials that reflect UV light sufficiently to achieve the anti-bacterial effect of the present invention. Additionally, in the shown embodiments, the top coat 40 is composed of a thin film of PFA (perfluoroalkoxy), acrylic, or silicon. However, in alternative embodiments, the UV clear top coat 40 may be composed of alternative embodiments. Application of the primer 36 prior to the UV clear top coat 40 ensures that UV clear top coat 40, rather than the primer 36 (e.g., aluminum), is in direct contact with the tank water.

In some embodiments, the reflective coating 32 may include a film composed of porous PTFE (polytetrafluoroethylene), such as a PTFE membrane and/or expanded PTFE. In such instances, the reflective coating 32 does not include the UV clear top coat 40, and the PTFE is secured (e.g., glued) onto the inner surface 22a, 26a, 30a of one of the walls 22, 26, 30 (preferably on the end walls 26, 30). In such instances, a backside of the film may be covered with a polymer including a surface energy higher than that of the PTFE (e.g., polypropylene), thereby facilitating attachment of the film to the tank 10. The thickness of the PTFE film is approximately 0.05-1.50 mm.

With reference to FIGS. 1-6, the water tank 10 additionally includes at least one UV LED 34. More specifically, the UV LED 34 is positioned on the inner surface 22a, 26a, 30a of one of the side walls 22, the first end wall 26, or the second end wall 30. In some embodiments, the UV LED 34 may be sealed within a waterproof housing within the tank 10. Specifically, the UV LED 34 forms a high intensity zone capable of irradiating microbes and other bacteria found within the water in the tank 10. The UV LED 34 is specifically positioned on one of the side walls 22 or end walls 26, 30 such that it reflects light directly toward the outlet 18. More specifically, the UV LED 34 and the reflective coating 32 radiate such that water exiting the tank 10 is irradiated of microbes. The UV LED 34 includes a wide viewing angle of at least 100 degrees, preferably 120-140 degrees. When the UV LED 34 is positioned on the first end wall 26 or the second end wall 30, the UV LED 34 is positioned at an angle less than ½ of the viewing angle of the UV LED 34 relative to the outlet 18. Therefore, the UV radiation is able to reach the outlet tip directly.

In some embodiments, the UV LED 34 may be positioned such that it may disinfect the entire opposite side wall 22 of the tank 10 from which it is mounted. In still further embodiments (FIG. 4), reflective tubing (e.g., PTFE tubing) 38 may be inserted into the outlet 18 in order to provide additional reflection within the outlet 18. In some embodiments (FIG. 9), the tank 10 includes several UV LEDs 34. The position of reflective coating 32 within the tank 10 depends on the position of the UV LED 34. In some embodiments, the tank 10 may only be partially coated with the reflective coating 32. More specifically, the reflective coating 32 may only be applied to the inner surface of the wall positioned opposite the wall including the UV LED 34 (e.g., the wall to be irradiated via the UV LED). For example, if the UV LED 34 is positioned on the first end wall 26, then the reflective coating 32 may only be applied to the inner surface 30a of the second end wall 30. In alternative embodiments, the reflective coating 32 may only be applied to the inner surfaces 26a, 30a of first end wall 26 and the second end wall 30.

The shape of the tank 10 depends on the position of the UV LED 34. For example, the tank 10 may be molded to a conical shape, or other alternative shape, to ensure the surface area of the wall including the UV LED 34 is greater than the surface area of the wall opposite to the UV LED 34, thereby improving tank reflection.

Figure 8:
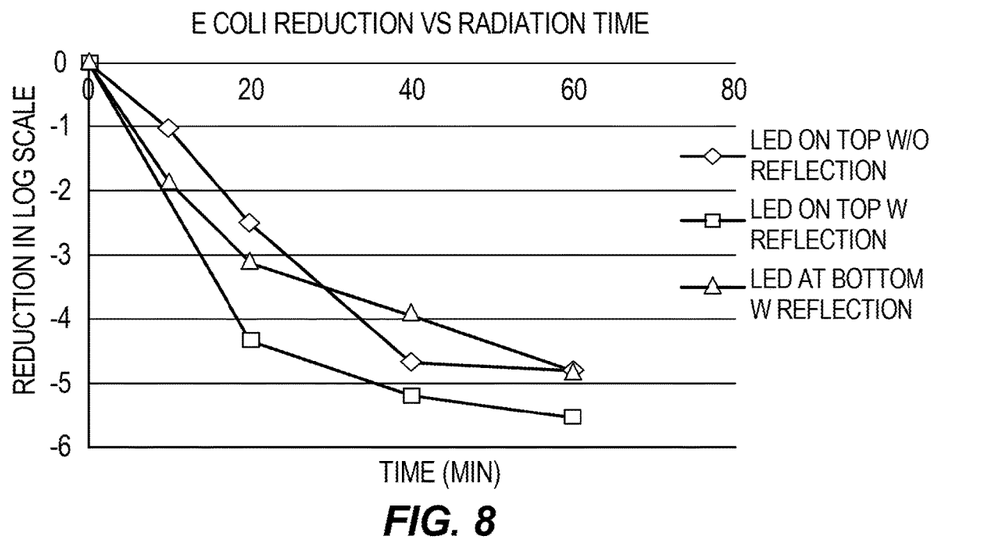
FIG. 8 is a graph of E coil reduction vs UV LED radiation time.

The position of the UV LED 34 and the reflective coating 32 impact the presence of bacteria (e.g., *E coli*) within the tank water. With reference to FIG. 8, altering the location of the UV LED 34 and the application of the reflective coating 32, impacts the levels of *E-coli* in stagnant tank water. Specifically, the results shown in FIG. 8 were obtained from an 8.5 L tank including one UV LED 34 and the reflective coating 32. More specifically, the test duration time was 20 minutes, during which the UV LED 34 was illuminated. The test was conducted on three different tanks: a first tank including the UV LED 34 positioned on the first end cover 26 without the reflective coating 32, a second tank including the UV LED 34 positioned on the first end cover 26 including the reflective coating 32, and a third tank including the UV LED 34 positioned on the second end cover 30 including the reflective coating 32. With continued reference to FIG. 8, the second tank displayed the greatest rate of change in the reduction of *E-coli* over time. Therefore, the optimal parameters for the tank 10 are positioning the UV LED 34 on the first end wall 26 and including the reflective coating 32.

The UV LED 34 is in connection with a control system 44 (FIG. 9) of the main treatment system. The control system 44 is operable to control the operation of the UV LED 34. Specifically, the control system 44 periodically operates the UV LED 34 at different currents to inhibit bacteria growth within the tank 10. In the shown embodiments, the control system 44 operates the UV LED 34 continuously with varying current settings. Additionally or alternatively, the control system 44 turns on the UV LED 34 and operates the UV LED 34 at a maximum operating current when the main treatment system is introducing water into the tank 10 via the inlet 14, and/or when the water is exiting the tank 10 via the outlet 18.

Operation of the tank 10 is initiated when a user operates the main treatment system, thereby initiating the flow of water from the water supply into the main treatment system. When the main treatment system is operating, the inlet 14 is opened to the system and the UV LED(s) 34 is turned on. The UV LED 34 remains on while water is flowing into the tank 10 via the inlet 14, and may remain turned on for a predetermined period of time immediately after the water supply stops flowing into the inlet 14. The tank 10 may store the water for extended periods of time, until the user opens the outlet 18 to remove the water from the tank 10. During periods of extended time where the main treatment system is off (e.g., not delivering additional water into the tank 10 via the inlet 14 or exiting water from the tank 10 via the outlet 18), the at least one UV LED 34 may be turned on in order to disinfect stagnant water held within the tank 10 at lower currents. Current may be varied based on operating status and stagnation hours. When the tank outlet 18 is opened, the UV LED 34 is turned on and the water may flow out of the tank 10, such that the water is disinfected as it is exiting the tank 10. After the outlet 18 is closed, the UV LED 34 remains on and is operated at a lower current.

In some embodiments, the cycle time and current output of the UV LED(s) 34 is variable during operating of the tank 10. Specifically, the control system 44 changes the duration time and intensity of the UV LED 34 depending on the operation status. When water is flowing into the tank 10 via the inlet 14, the control system 44 operates the UV LED 34 at a first, maximum intensity (e.g., a maximum current) and continues to operate at the maximum current for a predetermined period of time (e.g., within a range of 10-60 minutes after the water supply stops flowing). When the water supply stops flowing and the water within the tank 10 is stagnant, the control system operates the UV LED 34 at a second, lower intensity.

Figure 9:
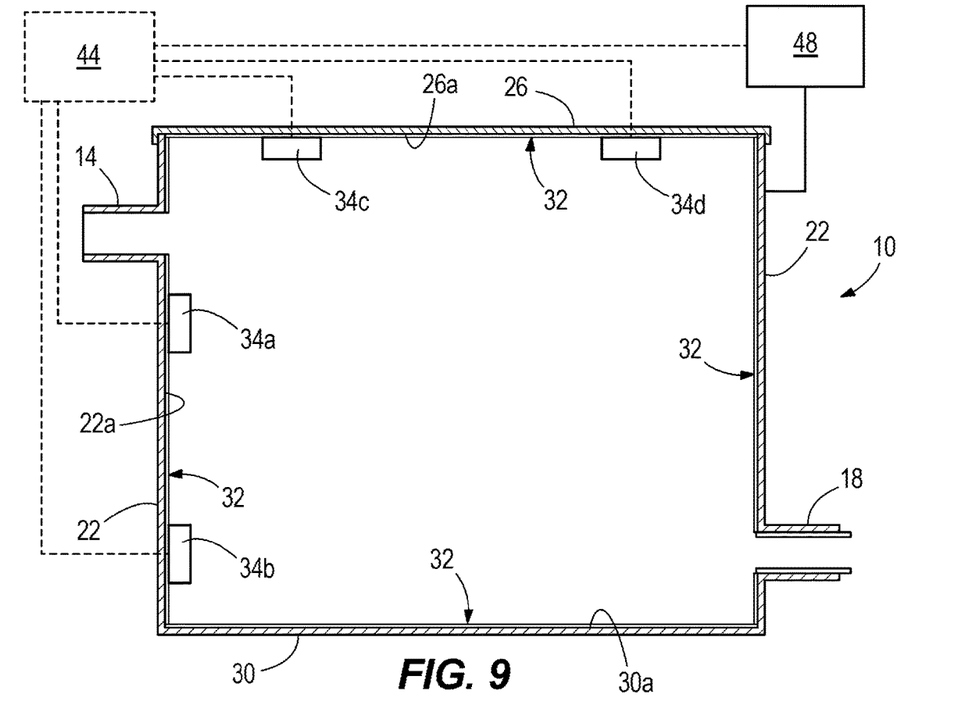
FIG. 9 is a schematic view of the sterilizing tank of FIG. 1, including various UV LEDs.

For example, the tank illustrated in FIG. 9 includes four UV LEDs: a first UV LED 34a, a second UV LED 34b, a third UV LED 34c, and a fourth UV LED 34d. The first and second UV LEDs 34a, 34b are positioned on the inner surface 22a of the sidewalls 22, and the third and fourth UV LEDs 34c, 34d are positioned on the inner surface 26a of the first end wall 26. When the user operates the main treatment system, the inlet 14 is opened. The control system 44 operates the UV LEDs 34a-34d at the first, or maximum, operating current to reach a maximum intensity level (e.g., a 100% intensity level). The UV LEDs 34a-34d remain operating at the maximum operating current as the tank 10 continues to fill with water.

When the user stops the main treatment system, thereby stopping the flow of water from the water supply into the main treatment system, the water in the tank 10 becomes stagnant and the tank 10 enters a transition state. The control system 44 then operates the four UV LEDs 34a-34d at the second operating current to achieve a lower intensity level. The second operating current is less than the first operating current, such that the UV LEDs 34a-34d operate at a second intensity level, which is 50%-100% of the maximum intensity level. The control system 44 operates the UV LEDs 34a-34d at the second operating current for a predetermined period of time. In the illustrated embodiments, the predetermined period of time is within a range of 10-30 minutes. However, in other embodiments, predetermined the period of time may be longer or shorter.

After the predetermined period of time, the tank 10 enters a stagnation state. The control system 44 turns off the first and second UV LEDs 34a, 34b, and operates the third and fourth UV LEDs 34c, 34d at a third operating current to achieve a lower intensity level. The third operating current is less than the second operating current, such that the UV LEDs 34c, 34d operate at a third intensity level, which is 20%-80% of the maximum intensity level. The control system 44 alternates the operation of the third UV LED 26c and the fourth UV LED 26d. More specifically, the control system 44 will operate the third UV LED 26c at the third operating current while the fourth UV LED 26d remains off for a duration of time, and then operates the fourth UV LED 26d at the third operating current while the third UV LED 26c remains off for the same duration of time. In the illustrated embodiments, the duration of time is 60 minutes. However, in other embodiments, the time period may be longer or shorter. Operating one of the UV LEDs 34a-34d during stagnation time maintains the tank 10 at a biostatic state and prevents regrowth of bacteria within the tank 10. Furthermore, alternating the operation between different UV LEDs conserves the LED life.

In some embodiments, the operating current of the UV LEDs 34a-34d is ramped up during the stagnation state, thereby gradually increasing the intensity level of the UV LEDs 34a-34d. For example, as illustrated in Table 1, at the initiation of the stagnation state (e.g., 1 hour), the control system 44 operates one of the UV LEDs (e.g., the first UV LED 34a) at a first current (e.g., 20 mA). After a period of time (e.g., 1 hour of stagnation and 2 hours of total operation), the control system 44 operates the UV LED 34a at a second current, which is greater than the first current (e.g., 30 mA). The control system 44 gradually increases the operating current until the UV LED 34a reaches the third operating current (e.g., 80 mA). In the illustrated embodiments, the UV LED 34a reaches the third operating current after 5 hours of stagnation of 6 hours of total operation. If the tank 10 remains in the stagnation state after the UV LED 34a achieves the third operating current (e.g., after 6 hours of stagnation and 7 hours of total operation), the control system 44 then operates the UV LED 34s at the first current value (e.g., 20 mA), restarting the operation. Alternating the current output of the UV LEDs 34a-34d, and operating the UV LEDs 34a-34d at an operating current less than the maximum operating current conserves the LED life. In some embodiments, the tank 10 includes a battery back-up, thereby allowing the UV LED(s) 34a-34d to continuously operate in the event of a power outage. An example operation schedule is shown in Table 1. In the example operation, the maximum current operation of the LEDs 34a-34d is 100 mA.

TABLE 1

Operating Current Output of UV LED during Stagnation Time

| Operating Status | Time (hours) | Operating Current Output (mA) |
|---|---|---|
| Filling tank | 0 | 100 |
| Post-filling tank | 0.5 | 100 |
| Stagnation | 1 | 20 |
| Stagnation | 2 | 30 |
| Stagnation | 3 | 40 |
| Stagnation | 4 | 50 |
| Stagnation | 5 | 60 |
| Stagnation | 6 | 70 |
| Stagnation | 7 | 80 |
| Stagnation | 8 | 20 |

As shown in Table 1, the current of the LEDs 34a-34d is modified based on operating status and stagnation time. During the tank filling cycle, the LEDs 34a-34d are operated at the maximum output to disinfect the incoming water. After filling the tank 10, the LEDs 34a-34d are continually operated at the maximum current output to completely disinfect the water and minimize the bacteria level (e.g., <10 cfu/ml). The tank 10 switches to a lower current output during stagnation. As the stagnation period gets longer, there is a higher possibility for bacteria regrowth. Therefore, the operating current gradually increases after a predetermined period of time (e.g., increasing 80% intensity every hour). As the LED current increases, disinfection rate includes and the bacterial level is minimized. If the stagnation period exceeds a predetermined period of time (e.g., 6 hours of stagnation, 7 hours of total operation), the system decreases to 20% current output and the cycle restarts. In some alternative embodiments, a single, low output current can be used through the entire stagnation period.

In some embodiments, the tank 10 may include only one UV LED positioned on the first end wall. In such instances, the UV LED remains on throughout the duration of the stagnation state. In some embodiments, the control system 44 may alternate operation of all of the UV LEDs 34a-34d. For example, the control system 44 may operate the first UV LED 34*a* for a duration of time, then turn off the first UV LED 34*a* and operate the second UV LED 34*b* for a duration of time, then turn off the second UV LED 34*b* and operate the third UV LED 34*c* for a duration of time, etc.

In some embodiments, the tank 10 may additionally include a pump 48 operable to recirculate water within the tank 10. In such instances, the pump 48 is operable to recirculate the water during the stagnation state in order to facilitate mixing of the water within the tank 10. The pump 48 may be initiated in predetermined time increments. For example, the pump 48 may operate every 2 minutes. Alternatively, the pump 48 may continuously operate during the stagnation state. In some instances, the pump operation initiates when one of the UV LEDs 34*a*-34*d* turns on.

Various features and advantages of the disclosure are set forth in the following claims.

What is claimed is:

1. A water tank configured to store water from a water supply, the water tank comprising:
    an inlet configured to receive water from the water supply;
    an outlet configured to dispense water;
    a reflective coating positioned on an inner surface of the tank; and
    an end wall including a light emitting diode oriented toward the outlet,
    wherein the light emitting diode and the reflective coating are operable to disinfect water from the water supply, and
    wherein the reflective coating is a film composed of porous PTFE,
    wherein the outlet includes tubing composed of PTFE.

2. The water tank of claim 1, wherein the end wall is a first wall and the light emitting diode is a first light emitting diode, further comprising:
    a second light emitting diode positioned on a second wall of the tank, wherein the second wall is positioned perpendicular relative to the first wall; and
    a control system operable to control the intensity output of the first and second light emitting diodes.

3. The water tank of claim 2, wherein the control system is operable to alternate the operation of the first light emitting diode and the second light emitting diode.

4. The water tank of claim 2, wherein the control system is operable to operate the first light emitting diode for a first period of time, and operate the second light emitting diode for a second period of time after the first period of time.

5. The water tank of claim 2, wherein the control system is operable to operate the first light emitting diode at a first operating current and the second light emitting diode at a second operating current, wherein the first operating current is different than the second operating current.

6. The water tank of claim 2, wherein the control system is operable to operate the first light emitting diode and the second light emitting diode at the same operating current.

7. The water tank of claim 2, wherein the control system is operable to modify the intensity output of the first and second light emitting diodes based on a state of the tank.

8. The water tank of claim 2, wherein the control system is operable to modify a duration of time the first and second light emitting diodes emit light based on a state of the tank.

9. A water tank configured to store water from a water supply, the water tank comprising:
    an inlet configured to receive water from the water supply;
    an outlet configured to dispense water;
    a reflective coating positioned on an inner surface of the tank; and
    an end wall including a light emitting diode oriented toward the outlet,
    wherein the light emitting diode and the reflective coating are operable to disinfect water from the water supply, and
    wherein the light emitting diode includes a viewing angle, and wherein the light emitting diode is oriented toward the outlet, at an angle less than half of the viewing angle, and
    wherein the outlet includes tubing composed of PTFE.

10. The water tank of claim 9, wherein the reflective coating includes a first layer applied to the inner wall, and a second layer secured to the first layer.

11. The water tank of claim 10, wherein the first layer is composed of an aluminum based primer and the second layer is a coat composed of one of PFA, acrylic, and silicon.

12. The water tank of claim 9, wherein the viewing angle of the light emitting diode is within a range of 100-140 degrees.

13. The water tank of claim 9, further comprising:
    a control system operable to modify an operating current of the light emitting diode based on a state of the tank.

14. The water tank of claim 13, wherein the control system is operable to modify a duration of time the light emitting diode emits light based on the state of the tank.

15. The water tank of claim 13, wherein the control system is operable to operate the light emitting diode at a first operating current when water is flowing into the tank, and at a second operating current when water within the tank is stagnant.

16. The water tank of claim 15, wherein when the light emitting diode operates at the first operating current, the light emitting diode has a first intensity value, and when the light emitting diode operates at the second operating current, the light emitting diode has a second intensity value, wherein the first intensity value is greater than the second intensity value.

17. The water tank of claim 16, wherein the second intensity value is within a range of 20%-80% of the first intensity value.

18. The water tank of claim 16, wherein the first intensity value is a maximum intensity value of the light emitting diode.

* * * * *